United States Patent [19]
Gladenbeck et al.

[11] Patent Number: 4,863,234
[45] Date of Patent: Sep. 5, 1989

[54] PROTECTIVE SHEATH FOR OPTICAL WAVEGUIDE SPLICE

[75] Inventors: Jürgen Gladenbeck, Bonn; Günter Fröhlich, Cologne, both of Fed. Rep. of Germany

[73] Assignee: U.S. Philips Corp., New York, N.Y.

[21] Appl. No.: 237,639

[22] Filed: Aug. 26, 1988

Related U.S. Application Data

[63] Continuation of Ser. No. 597,976, Apr. 9, 1984, abandoned.

[30] Foreign Application Priority Data

Apr. 12, 1983 [DE] Fed. Rep. of Germany ... 8310587[U]

[51] Int. Cl.⁴ .............................................. G02B 6/38
[52] U.S. Cl. .............................. 350/96.21; 350/96.20
[58] Field of Search .......................... 350/96.21, 96.20; 156/158

[56] References Cited

U.S. PATENT DOCUMENTS

| | | | |
|---|---|---|---|
| 4,078,910 | 3/1978 | Dalgoutte | 350/96.21 |
| 4,178,067 | 12/1979 | Johnson et al. | 350/96.21 |
| 4,258,977 | 3/1981 | Lukas et al. | 350/96.21 |
| 4,460,820 | 7/1984 | Matsumoto et al. | 350/96.21 |

FOREIGN PATENT DOCUMENTS 2022859 6/1979 United Kingdom .

OTHER PUBLICATIONS

"Splicing Technique for Graded Index Optical Fiber Cable", from 2254, *Japan Telecommunications Review*, vol. 24 (1982), Oct. 4, Tokyo, Japan.

*Primary Examiner*—William L. Sikes
*Assistant Examiner*—Robert E. Wise
*Attorney, Agent, or Firm*—William L. Botjer

[57] ABSTRACT

Protective sheath for fusion or adhesive optical waveguide splice. The protective sheath comprises a fusion bonding sleeve surrounding the splice and a shrinkable sleeve surrounding the fusion bonding sleeve. An oblong support is arranged between the fusion bonding sleeve and the shrinkable sleeve to protect the splice. The support has an open channel in which the splice is arranged.

9 Claims, 1 Drawing Sheet

PROTECTIVE SHEATH FOR OPTICAL WAVEGUIDE SPLICE

This is a continuation of application Ser. No. 597,976 filed Apr. 9, 1984, now abandoned.

BACKGROUND OF THE INVENTION

The invention relates to a protective sheath for a fusion or adhesive optical waveguides splice. The sheath comprises a fusion bonding sleeve and a shrinkable sleeve surrounding the splice, and an oblong support arranged between the bonding sleeve and shrinkable sleeve.

Fusion or adhesive bonding of optical-fibers has been finding increasing application in practice for connecting optical waveguides. Because the fibers have to be stripped of their plastic sheathing at the splice, the splice is mechanically weak and hence requires special protection.

In a known method of protection, the splice is embedded in cast resin. However, this method has the disadvantage that it is time-consuming. Time must be allowed for heating and curing the resin.

In another known method a spliced joint is embedded in a fusion bonding agent by heating. A shrinkable sleeve is arranged over the fusion bonding agent. In addition, a steel pin, which mechanically reinforces the protective sheath, is placed between the fusion bonding sleeve and the shrinkable sleeve. This, however, gives rise to the disadvantage that the fibers are pressed so strongly against the steel pin by the contraction of the shrinkable sleeve that mechanical damage or additional losses can occur.

SUMMARY OF THE INVENTION

It is an object of the invention to provide a protective sheath for an optical waveguide splice which is gentle on the splice, which is easy to handle, and which guarantees a certain protection of the splice.

The invention achieves this object by providing a support with an open channel. In the protective sheath of the invention, the splice is embedded in the fusion bonding agent inside the channel in the support and is covered by the shrink sleeve. The protective action of the shrink sleeve is coupled therefore with the protective positioning of the splice inside the channel in the support. The shape of the support offers additional mechanical protection against external forces and prevents the shrink sleeve from pressing on the splice.

In a further aspect of the invention the support may be designed with a U-shaped or semicircular cross-section. Furthermore, it is also feasible for the channel to have another cross-section, e.g. a V-shaped cross-section.

The support may be made of metal or glass. In an especially advantageous embodiment, however, the support is made of ceramic material. The use of ceramic material offers the advantage that the thermal expansion behavior is a good match for that of the optical waveguide.

Furthermore, the arrangement is such that the support and the fusion bonding sleeve are of the same length. This ensures that the fibers are embedded over the entire length of the support.

In order for the splice to be sealed off from the outside at both ends, a further version of the invention provides a shrink sleeve which is longer than the support or the fusion-bonding sleeve.

In addition, it is advantageous for the cross-sectional dimensions of the support and the fusion bonding sleeve to be designed such that the two parts are held clamped in the shrink sleeve. This makes the protective sheathing easier to handle and prevents any undesirable slipping out of the fusion bonding sleeve and/or support.

DESCRIPTION OF THE PREFERRED EMBODIMENTS

Figure 1:
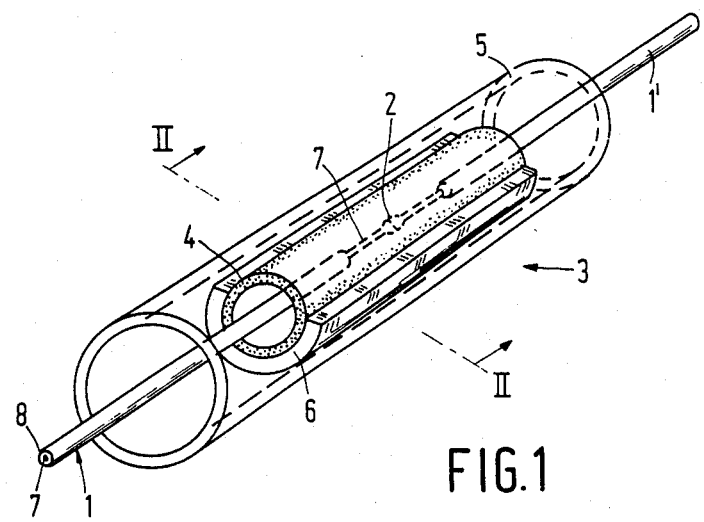
FIG. 1 a perspective view of an assembled splice with unshrunk sleeves.

FIG. 1 presents a perspective view of an optical waveguide 1 which is spliced with an optical waveguide 1'. The splice is inside a protective sheath 3.

The protective sheath 3 comprises a fusion bonding sleeve 4 which envelops the splice 2. Sleeve 4 is itself surrounded by a shrinkable sleeve 5. Between the fusion bonding sleeve 4 and the shrinkable sleeve 5 is a support 6 which has a semicircular cross-section. Fusion bonding sleeve 4 and shrinkable sleeve 5 are made of transparent material so that the inside of the protective sheath 3 can be seen, as illustrated in FIG. 2.

FIG. 1 also reveals that the fusion bonding sleeve 4 and the support 6 are of equal length. The linear dimension of the shrinkable sleeve 5 is greater than that of the fusion bonding sleeve 4 or the support 6, so that the shrinkable sleeve 5 projects beyond these parts at both ends.

The optical waveguides 1 and 1' consist of an optical fibers 7 which are surrounded by primary and secondary coatings 8.

Figure 2:
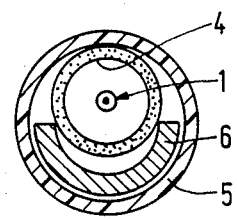
FIG. 2 a cross-sectional view along line II—II of FIG. 1.

FIG. 2 is a cross-section through the protective sheath 3 in the unfinished state. The dimensions of fusion bonding sleeve 4, support 6 and shrinkable sleeve 5 are selected here in such a way that these parts lock together. This prevents undesirable slipping out of fusion bonding sleeve 4 and/or support 6 from the shrink sleeve 5.

The support 6, which is semicircular in cross-section, is made of metal. However, another material may also be used, e.g. glass or ceramic. A ceramic material offers the advantage that the thermal expansion behavior is relatively well matched to that of the optical waveguide.

Figure 3:
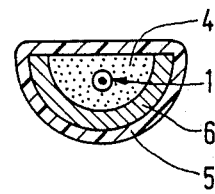
FIG. 3 a cross-sectional view of the protective sheath in its finished state.

FIG. 3 shows the protective sheath 3 after processing. By heating the protective sheath 3, the fusion bonding sleeve 4 is softened and, together with the optical waveguide 1, is pressed by the shrinkable sleeve 5 into the inside of the semicircular support 6. Therefore, the splice 2 lies well protected embedded in the fusion bonding agent inside the supporting profile 6. The semicircular cross-sectional shape of the supporting profile 6 prevents the shrunken sleeve 5 from pressing directly on the optical fiber 7 and thus on the splice 2. Consequently, no forces which can damage the splice are acting on the splice. At the same time, protection is provided against external forces.

The processing of the protective sheath 3 will now be described in greater detail. First, the two fiber ends are stripped of their primary and secondary coatings 8.

Then, the fiber ends are spliced by fusing them together. This can be done for example in known manner in an arc or in a gas flame.

The protective sheath 3, which has been slipped over one of the ends of the optical waveguides 1 and 1' before the ends are fused, is now aligned centrally with respect to the splice 2. The length of the protective sheath 3 was previously adapted to the stripped lengths of primary and secondary coating 8. Care should be taken to ensure here that the coating 8 extends on each side at least 5 mm into the protective sheath 3.

A heat source is used to soften the fusion bonding agent which then, together with the optical fiber 7, is pressed by the contracting shrink sleeve into the inside of the channel of the semicircular support 6. The protective sheath 3 is thus arranged in a fixed condition on the optical waveguides 1 and 1', and constitutes a mechanical reinforcement in the area of the splice 2.

Because the fusion bonding sleeve 4 and the supporting profile 6 are of equal length, the waveguides 1 and 1' are embedded in the fusion bonding agent over the entire length of the support. This guarantees a certain protection which is further strengthened by the envelope of the shrink sleeve 5. Since the shrink sleeve 5 is longer than the fusion bonding sleeve 4 and the support 6 at both ends, then, after the shrinkage process, its ends lie tight up against the secondary coating of the waveguides 1 and 1'. This hermetically seals the splice 2 from the external environment.

The protective sheath 3 is suitable for all known types of fibers and coatings and can, in the case of multiple splices, also be used for several optical fibers 7 simultaneously.

What is claimed is:
1. A protective sheath for a fusion or adhesive optical waveguide splice, said protective sheath comprising:
   a fushion bonding sleeve surrounding the splice;
   an oblong support having an open channel therein, said channel accommodating the entire splice and at least part of the fusion bonding sleeve; and
   a heat shrunk sleeve surrounding the support and pressing the fusion bonding sleeve and splice into the open channel in the support.
2. A protective sheath as claimed in claim 1, characterized in that the support has a U-shaped cross-section.
3. A protective sheath as claimed in claim 1, characterized in that the support has a semicircular cross-section.
4. A protective sheath as claimed in claim 1, characterized in that the support is made of metal.
5. A protective sheath as claimed in claim 1, characterized in that the support is made of glass.
6. A protective sheath as claimed in claim 1, characterized in that the support is made of a ceramic.
7. A protective sheath as claimed in claim 1, characterized in that the support and the fusion bonding sleeve have equal lengths.
8. A protective sheath as claimed in claim 7, characterized in that the heat shrunk sleeve has a length greater than the lengths of the support and the fusion bonding sleeve.
9. A protective sheath as claimed in claim 1, characterized in that the support and the fusion bonding sleeve have cross-sectional dimensions chosen such that they are clamped together by the heat shrunk sleeve.

* * * * *